US010093283B2

(12) United States Patent
Carroll

(10) Patent No.: US 10,093,283 B2
(45) Date of Patent: Oct. 9, 2018

(54) VEHICULAR WINDSHIELD WASHER FLUID REPLENISHING SYSTEM

(71) Applicant: WiperFill Holdings LLC, Jupiter, FL (US)

(72) Inventor: Matthew Carroll, Jupiter, FL (US)

(73) Assignee: WiperFill Holdings LLC, Jupiter, FL (US)

( * ) Notice: Subject to any disclaimer, the term of this patent is extended or adjusted under 35 U.S.C. 154(b) by 237 days.

(21) Appl. No.: 15/082,300

(22) Filed: Mar. 28, 2016

(65) Prior Publication Data

US 2016/0332601 A1    Nov. 17, 2016

Related U.S. Application Data

(63) Continuation-in-part of application No. 14/676,215, filed on Apr. 1, 2015, now Pat. No. 9,650,018.

(51) Int. Cl.
| | |
|---|---|
| *B60S 1/48* | (2006.01) |
| *B60S 1/50* | (2006.01) |
| *C02F 1/00* | (2006.01) |
| *B01D 35/027* | (2006.01) |
| *C02F 103/00* | (2006.01) |
| *C02F 1/42* | (2006.01) |

(52) U.S. Cl.
CPC ............. *B60S 1/50* (2013.01); *B01D 35/027* (2013.01); *B60S 1/48* (2013.01); *C02F 1/001* (2013.01); *C02F 1/42* (2013.01); *C02F 2103/001* (2013.01); *C02F 2201/008* (2013.01); *C02F 2303/24* (2013.01); *C02F 2307/00* (2013.01)

(58) Field of Classification Search
CPC .... B60S 1/48; B60S 1/50; C02F 1/001; C02F 2103/001; C02F 2201/008; C02F 2303/24; C02F 2307/00; B01D 35/027
See application file for complete search history.

(56) References Cited

U.S. PATENT DOCUMENTS

| | | | |
|---|---|---|---|
| 2,701,897 A | 2/1955 | Leming | |
| 2,703,127 A * | 3/1955 | Webb | B60S 1/48 383/116 |
| 2,770,017 A | 11/1956 | Oishei et al. | |
| 3,738,575 A * | 6/1973 | Somer | B60S 1/50 239/284.1 |
| 5,261,254 A | 11/1993 | Cuttane | |
| 5,347,661 A * | 9/1994 | Fly | E03D 9/037 222/187 |
| 5,669,986 A | 9/1997 | Buchanan, Jr. et al. | |
| 6,024,803 A | 2/2000 | Buchanan, Jr. et al. | |
| 6,266,842 B1 | 7/2001 | Muller | |
| 2013/0240419 A1* | 9/2013 | Carroll | B60S 1/48 210/95 |

FOREIGN PATENT DOCUMENTS

DE    10057980 A1 * 12/2002    ............... B60S 1/48

* cited by examiner

*Primary Examiner* — Matthew O Savage
(74) *Attorney, Agent, or Firm* — McHale & Slavin, P.A.

(57) ABSTRACT

A system and method of collecting and conditioning rainwater and other moisture, such as dew, from a windshield of a vehicle and utilizing the collected fluid to replenish the fluids in the windshield washer reservoir. A collection funnel is positioned on a vehicle in order to collect rainwater and other moisture. Rainwater and other fluids from the collection funnel are directed to a conditioning chamber where the water is treated with a concentrate and filtered. The treated fluid is then directed to a pre-existing windshield washer reservoir.

9 Claims, 3 Drawing Sheets

VEHICULAR WINDSHIELD WASHER FLUID REPLENISHING SYSTEM

REFERENCE TO RELATED APPLICATIONS

In accordance with 37 C.F.R. 1.76, a claim of priority is included in an Application Data Sheet filed concurrently herewith. Accordingly, the present invention claims priority as a continuation-in-part of U.S. patent application Ser. No. 14/676,215, entitled "WINDSHIELD WASHER CONDITIONER", filed Apr. 1, 2015, which claims priority to U.S. Patent Registration No. 9,000,000 entitled "WINDSHIELD WASHER CONDITIONER" and issued Apr. 7, 2015. The contents of the above referenced application is incorporated herein by reference.

FIELD OF THE INVENTION

The present invention relates generally to an apparatus and method of replenishing and conditioning the fluid within a windshield washing system. In particular, to an apparatus which can recover rainwater, dew and recapture dispensed fluids from the windshield of a vehicle to replenish and condition the fluid within a windshield washing system.

BACKGROUND OF THE INVENTION

Windshield cleaning systems are old and well known in the art. Most of them employ a reservoir containing a fluid, such as water. The water can include an additive which will prevent the water from freezing in the colder climates. This additive is commonly known as a deicer. The de-icer can also remove ice that has formed on the windshield of a vehicle. Other additives to the fluid reservoir include substances which enhance the cleaning properties of the water/fluid in the reservoir, such as all season windshield cleaner, all season windshield cleaner and de-icer, rain repellant with or without all season cleaner or all season windshield cleaner and de-icer.

In the winter months, when slush and other substances from the roads splash up onto the windshield of vehicles, the operator of the vehicle utilizes the windshield washer system repeatedly to clean the windshield to provide a clear view for driving. This high use of the windshield washer system can and normally does result in all of the fluid in the windshield washer reservoir being used up rapidly. If the vehicle operator is not vigilant in maintaining the washer reservoir full of fluid, the operator may be without the ability to clean the windshield when the need arises. Thus there is a need to provide a system and method of readily replenishing the fluid in a windshield washer reservoir without the vehicle operator constantly monitoring the fluid in the windshield washer reservoir.

DESCRIPTION OF THE PRIOR ART

U.S. Pat. No. 2,701,897 discloses a windshield cleaning system using water from the cooling system of an automobile. A metered amount of detergent is placed into the dispersed fluid.

U.S. Pat. No. 2,770,017 discloses a method of automatically replenishing the supply of liquefied solvent to the reservoir of a windshield washer. A trough or pipe line leads from the ventilating duct in the cowl as a means for recovering rainwater.

U.S. Pat. No. 3,738,575 discloses an automatic windshield washer for a vehicle of the type having a reservoir and spray nozzles. Means are provided to collect rain water and car wash water from the outer surface of the vehicle and means to feed the collected water to the reservoir. The valve means can trap sediment and add cleaning agents to the collected water.

U.S. Pat. No. 5,261,254 discloses a method and apparatus for self-replenishment of the solution contained within an automobile windshield washer system. Water is extracted from air such as through the use of a desiccant system in combination with an automobile air conditioning system. This water is combined with a stored concentrated anti-freeze liquid in a preselected ratio to produce a windshield washer solution having sufficient freezing point depression for use during winter weather conditions.

U.S. Pat. Nos. 5,669,986 and 6,024,803 disclose the use of rainwater on a vehicle to clean collection surfaces which have been contaminated with agents such as road salt and for storage in a reservoir for later use in windshield washing.

U.S. Pat. No. 6,266,842 discloses a windshield cleaning device for a windshield of a motor vehicle. A collecting device is provided for collecting and returning excess sprayed cleaning liquid, spray water, and rain water into the windshield fluid reservoir. A heat exchanger is provided for heating the cleaning liquid pumped by the pump by heat energy derived from the cooling water cooling the motor of the motor vehicle. A control circuit measures at least one temperature that can be the ambient temperature or the temperature of the cleaning liquid and allows pumping of the cleaning liquid onto the windshield only above a set temperature limit. A metering device automatically introduces an alcohol mixture, and optionally surface-active agents, into the cleaning liquid based on the measured temperature.

SUMMARY OF THE INVENTION

A system and method of collecting rainwater and other moisture, such as dew and melting rainwater, from a windshield of a vehicle and conditioning the collected fluid to replenish the windshield washer reservoir. One or more collection funnels are located at various locations on a vehicle. The fluid collected is directed to a fluid conditioning cartridge.

Accordingly, it is an objective of the present invention to provide a system that collects fluids and utilizes these fluids to replenish the windshield washer reservoir of a vehicle.

It is a further objective of the present invention to collect rain, melted snow or dew on a windshield to condition and replenish the fluid in a windshield washer reservoir of a vehicle.

It is a still further objective of the present invention to provide a disposable fluid filter to condition the fluids in a windshield washer reservoir of a vehicle.

It is still yet a further objective of the present invention to provide a replaceable or refillable mixing cartridge using a wick between the collection point of rain, dew, or other fluids and a windshield washer reservoir. Fluid additives may be added to the collected fluids in the mixing cartridge and the resulting fluid delivered to a pre-existing windshield washer reservoir on a vehicle.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
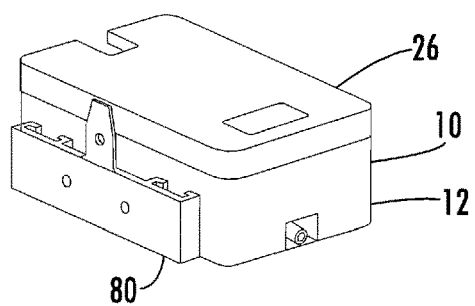
FIG. 1 is a perspective view of the present invention.
Figure 2:
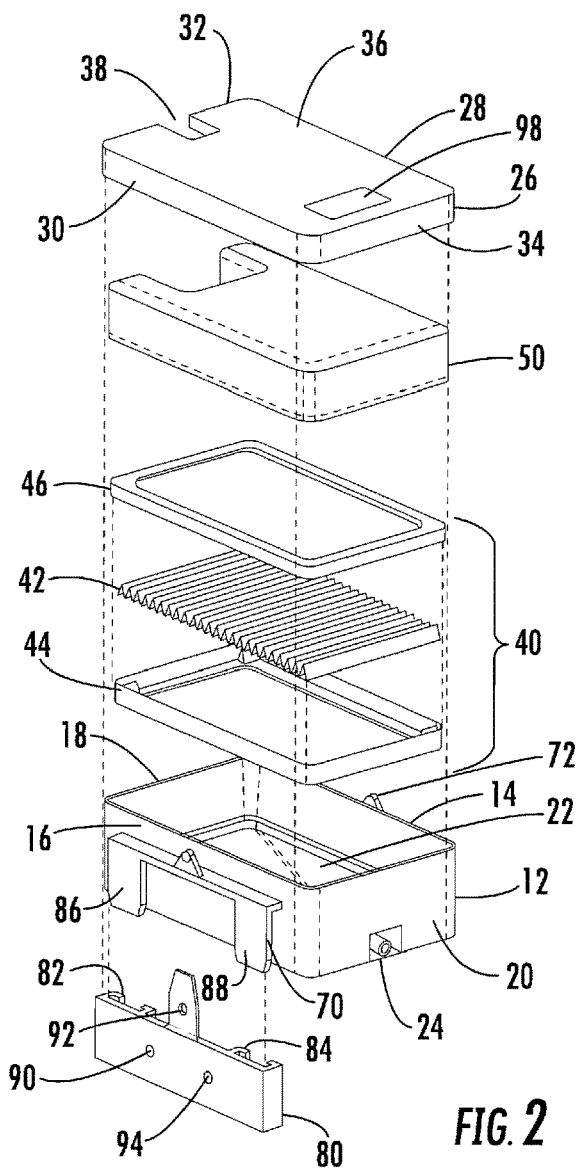
FIG. 2 is an exploded view thereof.
Figure 3:
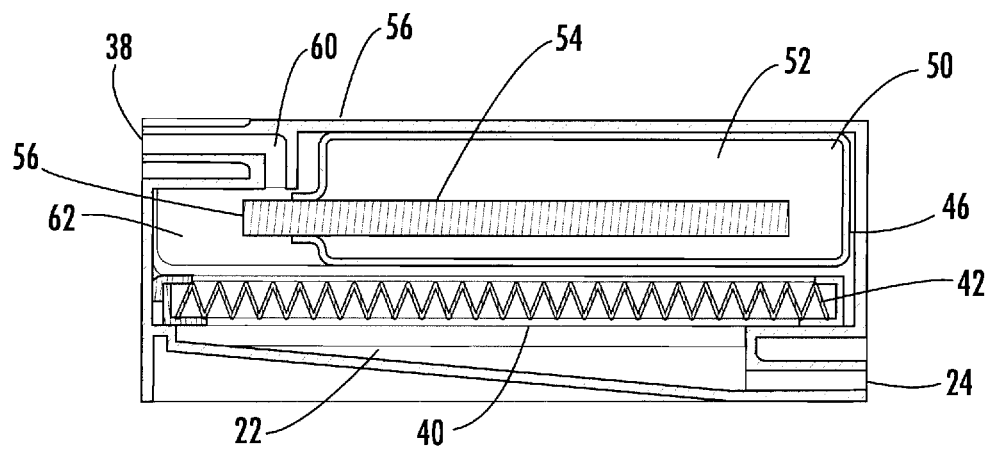
FIG. 3 is cross sectional side view thereof.
Figure 4:
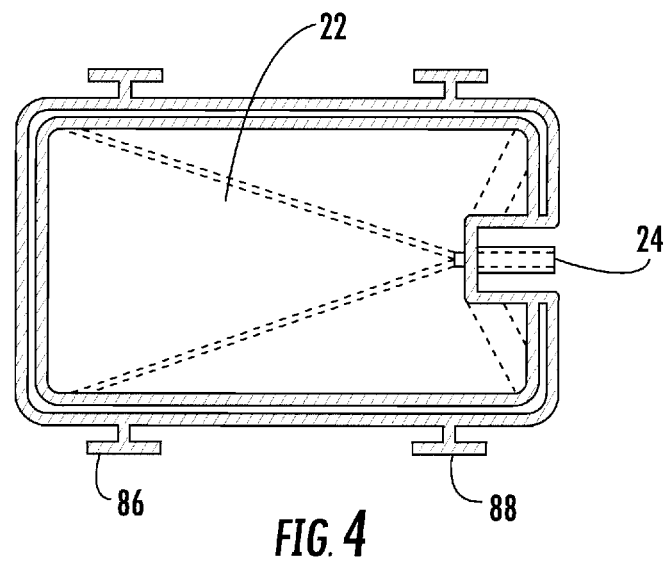
FIG. 4 is a top view thereof.
Figure 5:
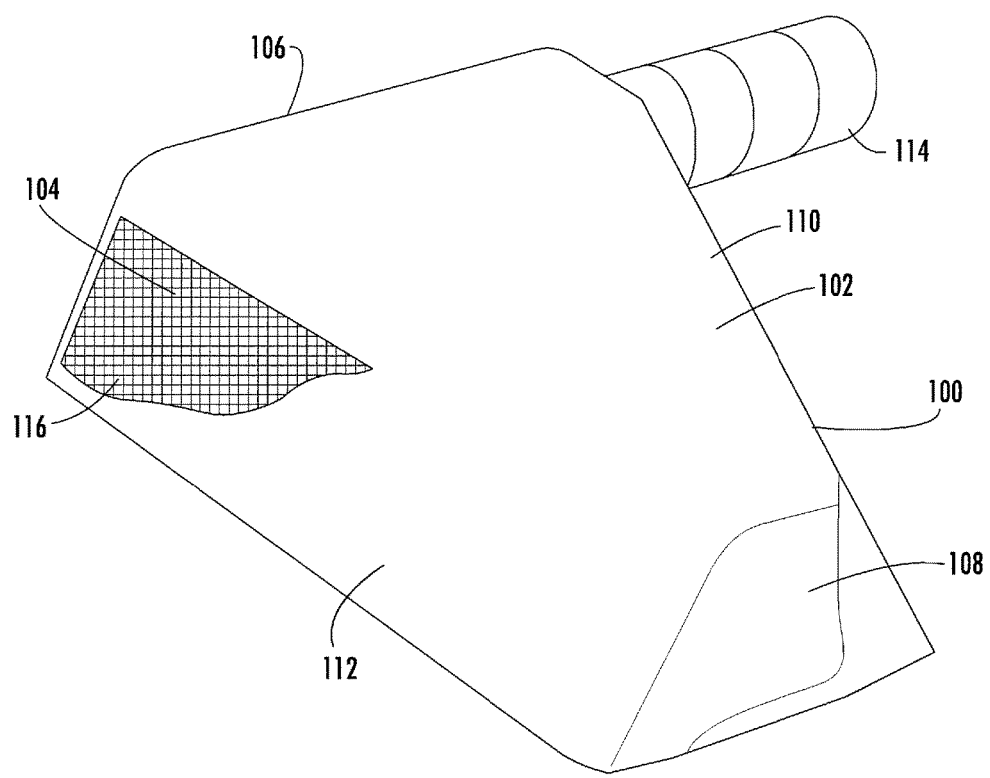
FIG. 5 is a perspective view of a collection funnel.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Now referring to the figures in general, set forth is a vehicular windshield washer fluid replenishing system. The system allows for the conditioning and treating of water that impacts the windshield of a vehicle to supplement a pre-existing windshield washer reservoir. The system consists of a housing 10 having a base 12 and a lid 26. The base 12 consists of side walls 14 and 16, end walls 18 and 20, and a sloped bottom wall 22. The sloped bottom wall works as a directional ramp to expel fluid from the base through outlet 24 located along end wall 20. The housing 10 includes a removable lid 26 formed from side edges 28 and 30, and edges 32 and 34 and top wall 36. An inlet 38 is located along end edge 32. The base 12 and lid 26 form an enclosure for containing a filter assembly 40 and a solution tank assembly 50. The filter assembly 40 employs a filter 42 capable of filtering particulates greater than 30 microns from fluid. The filter 42 has a length and a width as to approximate the length and the width of the base 12. The filter 42 is supported by a lower frame 44 and an upper frame 46 wherein the filter 42 material can be replaced. The filter assembly 40 is releasably secured within the base 12 to allow for ease of installation and removal. The filter 42 is sized and constructed to provide a low flow rate for optimal longevity of the filter. In the preferred embodiment the filter 42 is pleated to increase the available surface area for treating fluid.

The solution tank assembly is a removable concentrate housing 50 securable within the base 12 and positioned over the filter assembly 40. The concentrate housing 50 has an internal chamber 52 for holding of a fluid concentrate. The concentrate chamber forms a single replaceable cartridge assembly and can be replenished or reconditioned upon exhaustion for reuse.

A wick 54 is placed within the concentrate housing 50 is of a length to draw concentrate from the volume of the internal chamber 52 and extend outward from the chamber through exposed end 56. The length of the wick 54 having a section within the chamber 52 will be saturated with concentrate, and an exposed end 56 of the wick extends outward from the aperture at a position beneath portal 60. The portal 60 is fluidly coupled to the inlet 38. Fluid collected from the windshield is directed through the inlet 38 into portal 60 which is at a position so as to direct water flow to contact the wick 54. The water is treated by combining with concentrate drawn through the wick which is collected into mixing chamber 62. The concentrate includes various types of fluid additives, such as, but not limited to, soap, all-season windshield cleaner, de-icer, rain repellent with or without all-season cleaner, methanol/ethanol/ethylene glycol (antifreeze). The wick 54 operates by use of a capillary draw of concentrated fluid from the concentrate chamber 52 so as to deliver a pre-determined amount of the concentrate into the mixing chamber 62. The wick can be constructed of any suitable material that works with the capillary action. In a preferred embodiment, the wick is tape style and can be comprised of wool, synthetic, cotton, polyester or any other suitable material capable of wick properties having passageways.

The concentrate is of a formulation sized for passing through the passageways of the wick without clogging or blocking. The treated fluid in the mixing chamber 62 is directed through the filter assembly 40 to remove particulates. In the preferred embodiment the use of a 30 micron filter provides the longest longevity while capable of filtering sufficiently to remove particles capable of clogging spray jets used in most all vehicles. The treated and filtered fluid passes through the filter assembly 40 and collects on the bottom wall 22 of the base 10. The bottom wall 22 is sloped so as to direct the treated fluid toward outlet 24.

The base 12 includes a first bracket 70 formed along side wall 16, with a second bracket 72 forming a reciprocal of bracket 70 position along wall 14. Brackets 70 and 72 allow for ease of engagement with a mounting bracket 80 for securement within the engine compartment of a vehicle. The mounting bracket 80 includes receptacles 82 and 84 for receipt of tangs 86 and 88 of bracket 70. The mounting bracket 80 includes apertures 90, 92 and 94 available for receipt of a fastener, such as a screw, so as to secure the housing to the vehicle.

The lid 26 includes a clear sight viewing port 98, located along the top wall 36, so as to allow inspection of the concentrate housing 50, for determining concentrate levels. In the preferred embodiment, the concentrate housing 50 is made of a transparent or translucent material, allowing ease of inspection of the concentrate fluid.

Water collected for introduction into the inlet aperture is performed by a collection funnel 100 having an angular shaped upper wall 102 and lower wall 104 spaced apart by opposing side walls 106 and 108 and back wall 110. A front wall 112 is sloped wherein water entering the funnel is directed by the walls shapes to an outlet 114. The outlet 114 is coupled to the inlet 38 of the lid 26 by a flexible tube, not shown. A stainless steel screen 116 is placed over the entry of the funnel 100 to prevent larger matter from clogging the outlet 114. The collection funnel 100 is constructed and arranged for positioning between a windshield and hood of a vehicle for the collection of water.

In a preferred embodiment the collection funnel 100 is positioned on the driver's side of the vehicle but could be positioned in another suitable location. One edge of the mouth will be contoured to fit the arc of the windshield and ensure a water tight seal. This edge will most likely be made of a soft rubber or any suitable material for creating a water tight seal. The positioning of the collection funnel 100 provides gravity feeding of collected liquid to the housing 10. In addition to gravity flow, pumps and other types of fluid transport mechanisms can be utilized to transport the fluids from the collection funnel 100 to the housing 10.

All patents and publications mentioned in this specification are indicative of the levels of those skilled in the art to which the invention pertains. It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A vehicular windshield washer fluid replenishing system for conditioning and treating water that impacts the windshield of a vehicle to supplement a pre-existing windshield washer reservoir comprising:
   a collection funnel for receipt of water that drains from the windshield for directional passage of the water;
   a housing coupled to a collection funnel outlet, said housing defined by a removable top wall, a bottom wall, side walls, and end walls, one of said walls having an inlet coupled to said collection funnel;
   a removable concentrate housing secured within said housing, said concentrate housing having a chamber for placement of a fluid concentrate;
   a wick extending from said chamber of said concentrate housing to a mixing chamber formed within said housing, said wick providing a capillary draw of concentrate from said concentrate chamber to said mixing chamber, said mixing chamber fluidly coupled to said collection funnel outlet;
   a removable filter secured within said housing to filter said fluid treated with concentrate drawn from said wick in said mixing chamber;
   an outlet for directing conditioned and filtered fluid to a vehicle washer reservoir through a fluid conduit wherein said conditioned and filtered fluid is available for distribution onto a windshield.

2. The vehicular windshield washer fluid replenishing system according to claim 1, wherein said chamber is available for receipt of antifreeze; wherein said antifreeze is used to lower the treated fluid freezing temperature.

3. The vehicular windshield washer fluid replenishing system according to claim 1, wherein said filter is capable of filtering particulates greater than 30 microns from the fluid.

4. The vehicular windshield washer fluid replenishing system according to claim 3, wherein said filter has a size defined by a length and a width thereof that is about equal to a length and width of the housing, said size constructed to provide a low flow rate for optimal longevity of the filter.

5. The vehicular windshield washer fluid replenishing system according to claim 4, wherein said filter is pleated.

6. The vehicular windshield washer fluid replenishing system according to claim 1, wherein said concentrate chamber forms a single replaceable cartridge assembly.

7. The vehicular windshield washer fluid replenishing system according to claim 6, wherein said cartridge assembly can be reconditioned for reuse.

8. The vehicular windshield washer fluid replenishing system according to claim 1 including a viewing port in a portion the removable top wall adjacent said removable concentrate housing allowing visual determination of concentrate level.

9. The vehicular windshield washer fluid replenishing system according to claim 1 wherein said collection funnel further including a screen to filter out large particles.

* * * * *